UNITED STATES PATENT OFFICE 2,401,147

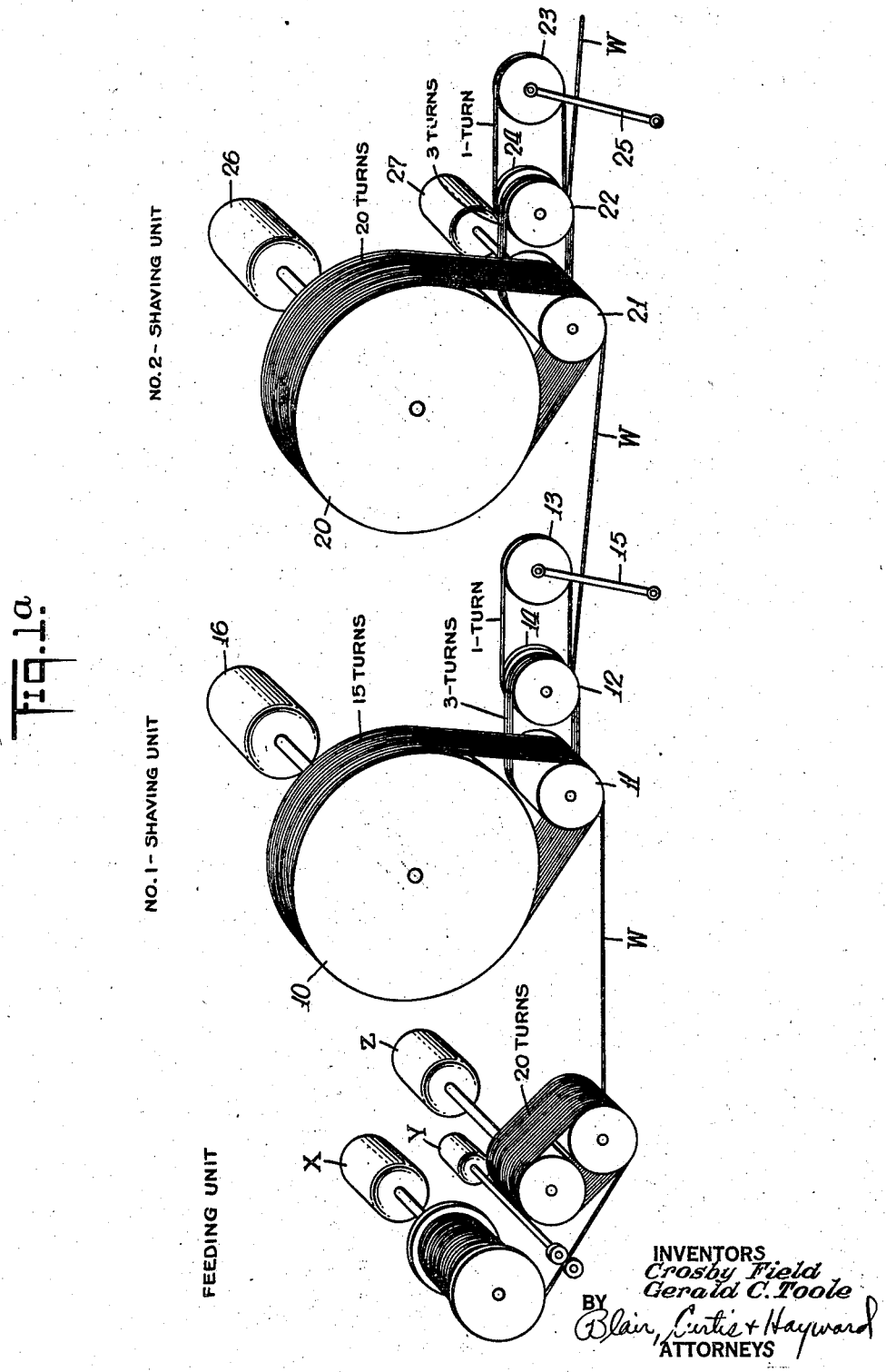

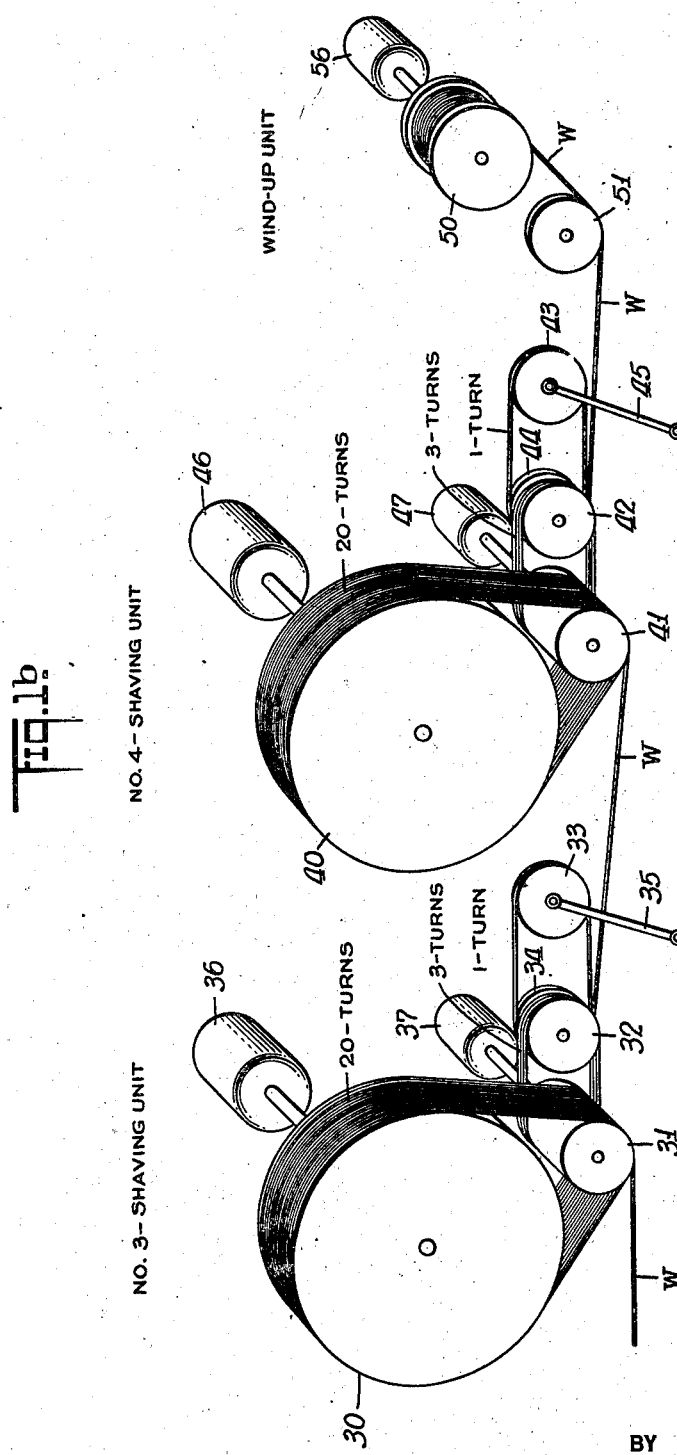

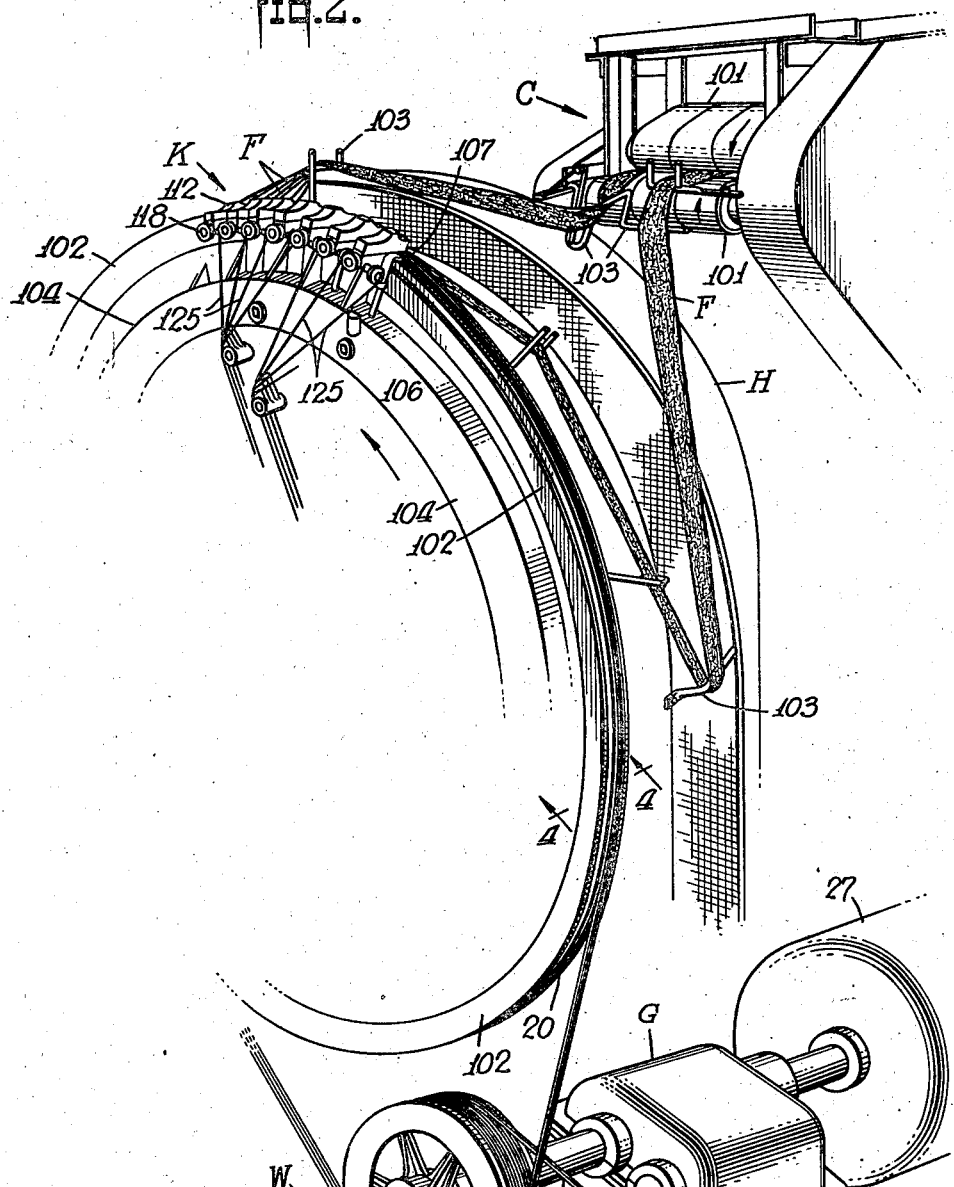

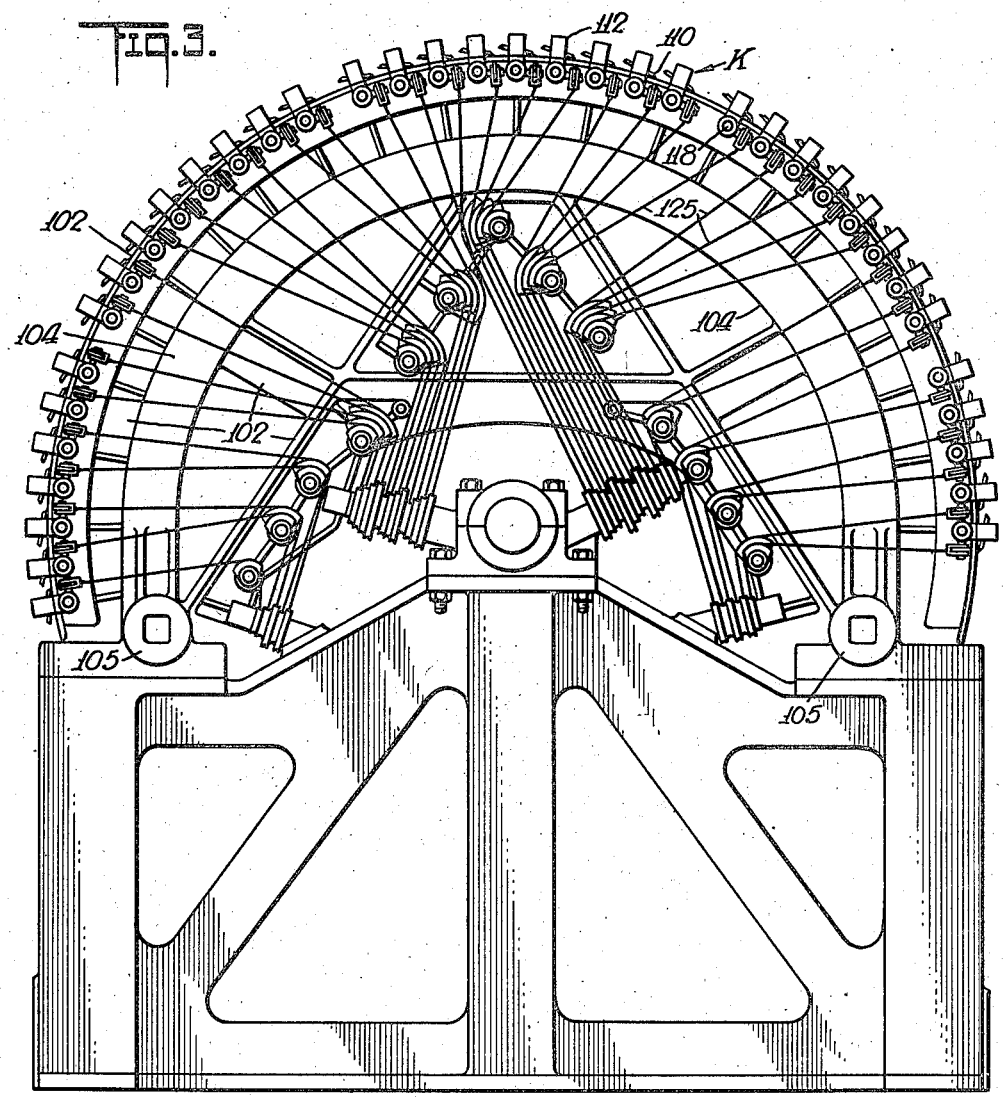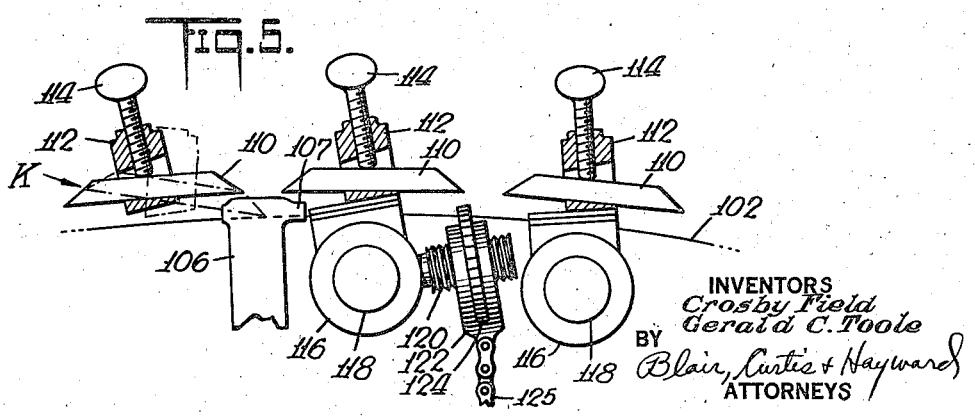

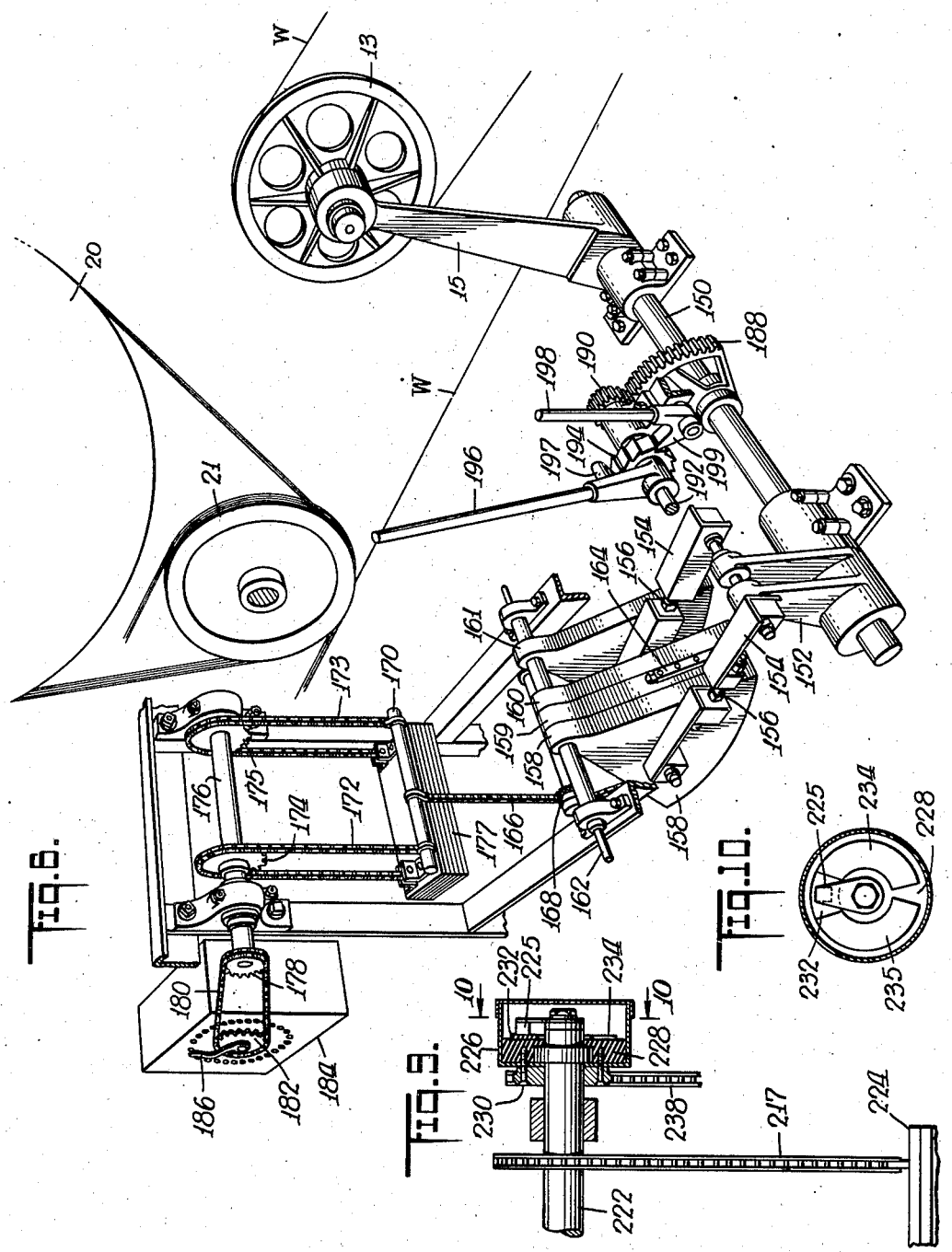

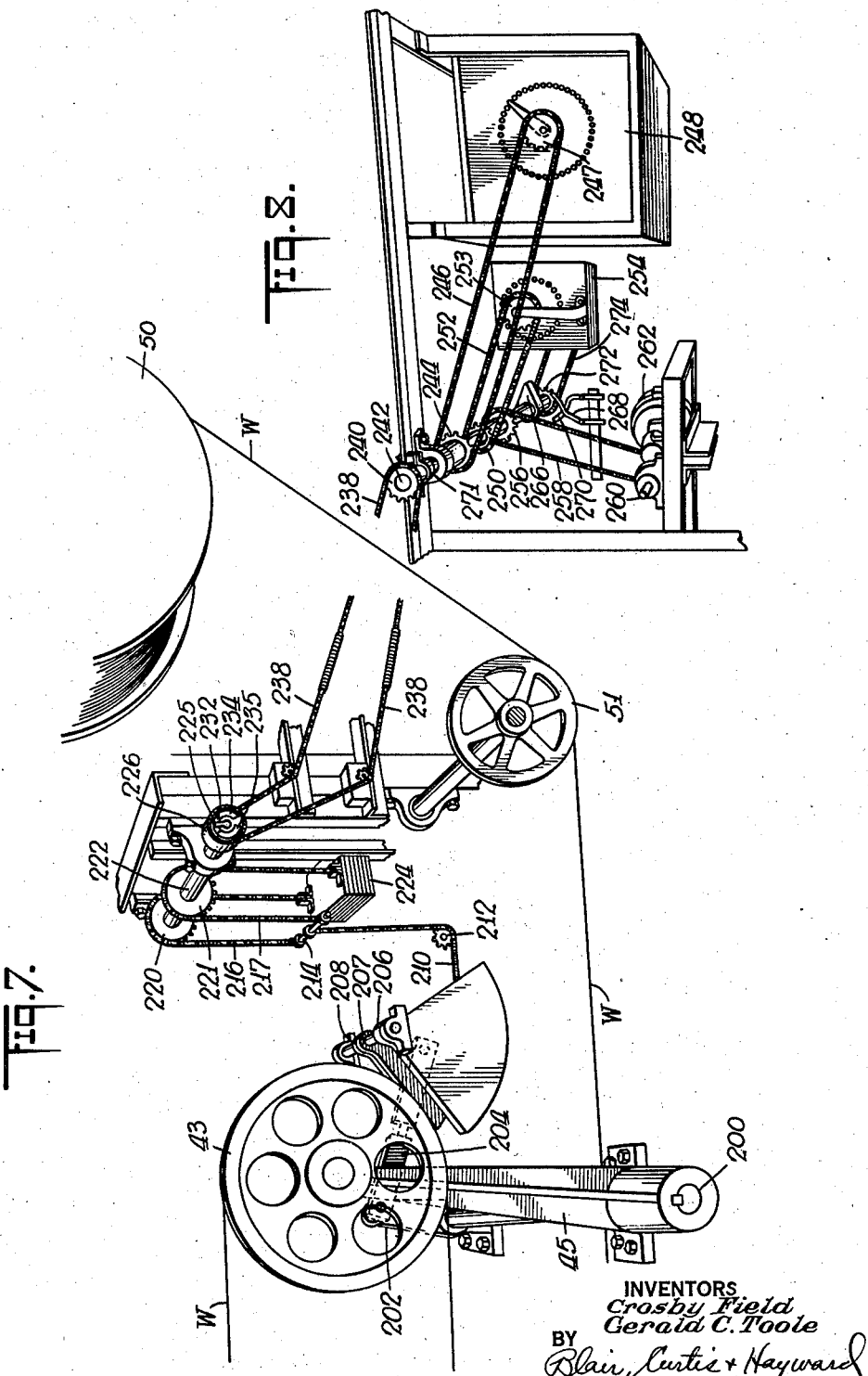

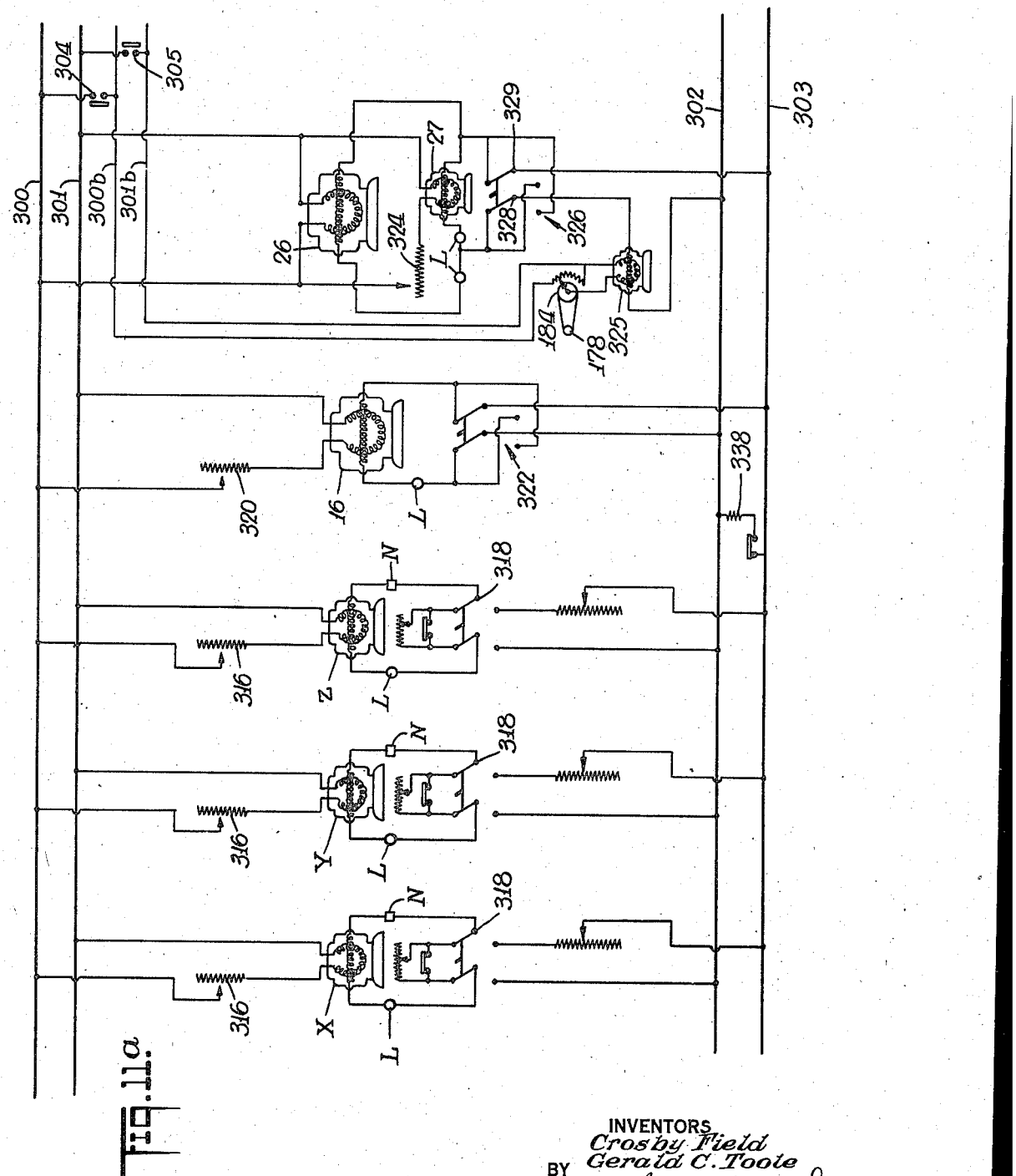

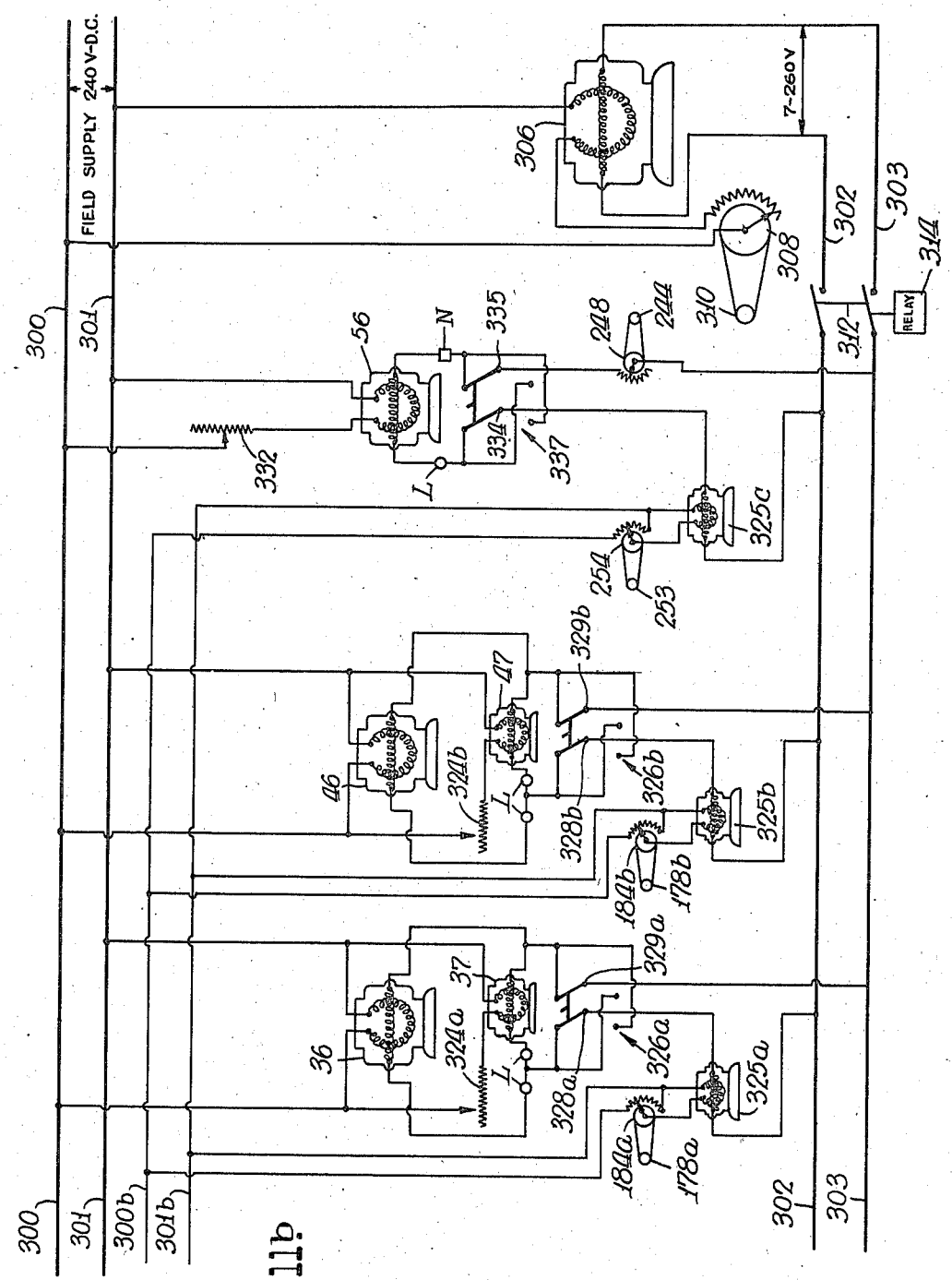

APPARATUS FOR CUTTING METAL

Crosby Field, Brooklyn, and Gerald C. Toole, St. Albans, N. Y., assignors to Brillo Manufacturing Company, Inc., Brooklyn, N. Y., a corporation of New York Application December 4, 1942, Serial No. 467,868

6 Claims. (Cl. 29—4.5)

The present invention is shown as embodied in a plant for grooving metal, preferably steel, in such manner that the metal cut from the grooves shall constitute tough, elastic, long-staple filaments or fibers, of extremely minute but relatively uniform section and presenting sharp edges. Many of the novel features of the invention involve specific adaptations for this specific purpose. It will be found, however, that certain features of the invention are applicable for cutting operations other than grooving, or for operating on metals other than steel or for purposes other than producing the specific product above described.

The specific material which I prefer to employ is steel wire or rod material of circular cross-section, such as is commonly supplied in bundle coils. Many features, even very specific features, of the method are applicable to steel or other material in other forms, as, for instance, wires or rods or bands of metal that are of triangular, rectangular polygonal or other desired cross-section. For the preferred use and for producing the preferred fibrous or wood-like material from cylindrical drawn wire or rods of bendable diameter, the invention involves close cooperative relation of many novel features and arrangements.

In the present commercial art some of the machines in general use for the above purposes consist essentially of a stationary bed over which a wire is drawn by a power-driven drum at one end of the bed. As the wire is drawn over the bed, it is guided and supported by tracks or grooves formed in the latter. A series of knives or cutters are arranged in tandem along the bed so as to be accurately adjustable and rigidly clamped with respect to the latter.

In the place of the stationary bed-type of apparatus, where great tension is required on the wire to overcome friction between the wire and the bed, machines of the tractor wheel type illustrated in Patents Nos. 1,608,478, 1,608,481 and 1,886,661, were developed, and these machines have taken a dominant position in the wire industry. They embody a series of wire carrying, rotating, power-driven tractor wheels or drums which relieve the wire of much of its tension and which make the bed friction available for applying traction to the wire. In this arrangement the surface of the tractor wheels opposite each of the knives can supply all, or a large part, of the traction necessary to feed the wire against the cutting resistance of the knives. Consequently the number of knives that can be used in series all working successively on the same wire can be increased to almost any desired extent without danger of breaking the wire because there is no corresponding increase of end traction required thereupon.

In machines of the tractor wheel type the traction of the winding reel where the scrap from the machines is wound may be reduced to that required to keep the wire in close frictional engagement with the last tractor wheel bed, and this has preferably been regulated in the past by an automatic constant tension drive, either through a friction clutch or a slipping belt or by electrical motors with an electrical control system such as described in Patent No. 1,608,481.

With a single large tractor wheel from twenty to sixty knives have been used and in such cases it becomes practical to have one-directional operation. An important feature in multiplying the number of knives on a given tractor wheel lay in combining the wheel with means for keeping the wire at the proper tension so that as the number of knives was increased the wire would not slip with respect to the wheel.

In tractor wheel systems in the past it has been the practice to use a relatively large number of tractor wheels, each with a limited number of knives, in reducing the wire to scrap in a single pass through the plant. It has been discovered, however, that the number of wheels heretofore regarded as desirable may be reduced, with a consequent reduction in operating costs, by providing friction boosters in connection with each of the tractor wheels. It was found that the commonly accepted formulae for the increase of friction with the linear amount of surface covered by a wire wrapped around a wheel did not apply for more than one turn of wire when the outer surfaces of the wires were subjected to such friction as is obtained by cutting layers off of these turns. It was discovered, however, that this lack of friction might be more than compensated for, and the possible number of cutting knives accordingly increased, by the insertion into the system of a power-driven sheave on which no cutting was done. In order to accomplish this, mechanisms to be described hereinafter were developed and the sheaves of these mechanisms will be referred to hereinafter as "capstans."

One advantage of this capstan arrangement is that the pull on the wire is maintained regardless of the speed at which the plant is operated. Another advantage of this capstan arrangement lies in the fact that it is possible to impress a given driving force upon the wire with less tension in the wire than would be possible without the capstan, i. e., the tension necessary in the wire when it is wrapped around a simple wheel without a friction booster is greater than the tension necessary for driving the same wire past the same number of cutting knives when a friction booster is used in combination with the tractor wheel. This reduction in tension which the capstans make possible permits a much greater number of knives to cut all turns without wire slippage than was possible in tractor wheel systems of earlier types.

An electrical booster control, which forms a part of the invention and which will be described hereinafter, operating in the armature circuits of some of the motors driving the tractor wheels and capstans, gives the advantages of supplying extra torque to the wheel and capstan motors, particularly at low speeds and in starting, which torque is not obtainable with reduced armature voltage where resistance in the fields alone of the driving motors is relied upon to obtain speed control.

Hence, it has become possible to increase the number of knives on each tractor wheel and at the same time to maintain the proper frictional drive on the wire so that the wire may be driven past the knives without any slipping between the wire and the tractor wheel. These electrical boosters have been combined with an improved type of idler construction so as to maintain constant tension in the wire during variations in the speed at which the wire is driven. The result is that the wire can be reduced to scrap in a single pass through a smaller number of wheels in series and in actual practice it has been possible to reduce the scrap wire to a segmental thickness as low as $9/1000$ of an inch, thus giving a yield of above 95 per cent of the original cross-sectional area of the wire.

This extremely small segmental thickness has been made possible in part by the addition of an improved electrical relay system which controls the tension of the wire between the fourth tractor wheel and the wind-up drum.

In commercial use in a plant embodying the present invention, it has been found that the electrical controls hereinafter described for the friction boosters and the electrical relay at the wind-up drum make possible the starting of the plant under full load, and that the plant can be continuously run, giving a higher yield and with fewer operators than has heretofore been possible. Plant efficiency has been increased partly because the improved control system has reduced time lost through wire breakage.

It is an object of the present invention to provide a device of the character described, having to a notable extent the characteristics and capabilities above set forth. A further object is the provision of apparatus for cutting metal wool from a wire in an improved manner. An additional object is the provision of a plant for producing metal wool wherein the wool is cut from a wire wrapped around a relatively small number of tractor wheels, associated with friction booster means, and to provide in such a plant an improved electrical control system. Still another object is the provision of a plant of the character above described wherein operations may be initiated under full load. A further object is the provision of a tractor wheel and associated friction booster wherein it is possible to use a number of knives creating a greater drag on the wire being cut than the frictional drive between the tractor wheel and the wire. Still another object is the provision of an automatically equalized dynamic braking system wherein the plant is brought to a stop immediately and evenly upon a break anywhere in the wire being cut or upon an overload upon any motor. An additional object is the provision in a plant of the above type of means whereby the various tractor wheels and friction boosters may be independently operated and adjusted either in the forward or reverse direction so that a break anywhere in the wire may easily be repaired. A further object is the provision in a plant of the above type of a delicate counterbalancing system wherein the tension on the wire may be very accurately adjusted, along with an electrical relay responsive to the counterbalanced system for accurately controlling electrical means for varying driving forces on the wire. Other objects will be in part pointed out as the description proceeds and will in part become apparent therefrom.

In the accompanying drawings, in which a preferred embodiment for attaining the above objectives is set forth and in which like reference characters refer to like parts throughout the various views:

Figures 1a and 1b in combination are a schematic representation of a plant embodying the invention;

Figure 2 is a perspective view of portions of one of the shaving units schematically represented in Figures 1a and 1b;

Figure 3 is an elevational view, with parts removed, of one of the main tractor wheels represented in Figures 1a and 1b;

Figure 4 is a section through a portion of the tractor wheel shown in Figure 2, taken along the line 4—4 in the direction of the arrows;

Figure 5 is an enlarged detail of structure shown in Figure 3 showing the manner in which the shaving knives are mounted;

Figure 6 is a perspective view, with parts broken away, of a portion of the control mechanism associated with one of the shaving units for maintaining the proper driving force upon the wire;

Figure 7 is a perspective view, with parts broken away, of a portion of the control mechanism which governs the speed at which the wind-up drum is driven;

Figure 8 is a perspective view, with parts broken away, of another portion of the control mechanism by which the speed of the wind-up drum is governed;

Figure 9 is an enlarged detail, partly in section, of an electric relay illustrated in Figure 7;

Figure 10 is a view, partly in section, taken along the line 10—10 of Figure 9 in the direction of the arrows; and Figures 11a and 11b in combination represent schematically the electrical circuits whereby the plant is controlled.

*Path followed by the wire*

Referring to Figures 1a and 1b, there is schematically presented the manner in which a wire to be cut into wool is led through the plant. At the left-hand side of Figure 1 a feed drum carrying a coil of wire is shown. Wire is led from the feed drum through a pair of snubber rolls and is wrapped twenty times around a pair of feeding capstans. The feed drum is represented as mounted on the same shaft with a generator X, which serves as an electric brake. One of the snubber rolls is mounted on the same shaft with a generator Y and one of the feeding capstans is mounted on the same shaft with a generator Z. The feed drum, snubber rolls and feeding capstans and their associated generator brakes comprise a feeding unit which is not a part of the present invention, but which will be described in greater detail and claimed in the copending application of Crosby Field, filed herewith.

The wire, indicated by W, is led from the feeding unit to the No. 1 shaving unit where it passes fifteen times around a tractor wheel 10 and an idler wheel 11. After thus passing around the tractor wheel and idler wheel, the wire is wrapped three times around idler 12 and idler wheel 11, as illustrated, and then passes once around dancer roll 13 and a dancer roll idler 14 before going to the next shaving unit. A motor 16 is for driving tractor wheel 10. Idler 12 and dancer roll idler 14 are loosely and independently mounted for rotation about the same axis. Dancer roll 13 is carried by a dancer roll arm 15 pivotally mounted at its lower end. This pivotally movable dancer roll aids in maintaining proper wire tension in a manner to be described more fully hereinafter.

The wire from shaving unit No. 1 proceeds to shaving unit No. 2 where it passes twenty times around a tractor wheel 20 and a capstan 21. Thereafter it passes three times around capstan 21 and an idler 22, and then once around a dancer roll 23 and a dancer roll idler 24 before going to the next shaving unit. Tractor wheel 20 is indicated as driven by a motor 26 and capstan 21 is indicated as driven by a motor 27. Idler 22 and dancer roll idler 24 are loosely and independently mounted for rotation about the same axis. Dancer roll 23 is carried by a dancer roll arm 25 pivotally mounted at its lower end.

No. 3 shaving unit and No. 4 shaving unit are identical with No. 2 shaving unit, as illustrated. From No. 4 shaving unit wire W passes beneath a wind-up idler 51 to the wind-up drum 50, driven by motor 56.

Hence it is observed that the present plant includes only four shaving units whereas in preceding plants of the tractor wheel type twice this number of shaving units, or more, were common. One of the chief advantages of the power-driven capstans 21, 31, and 41 lies in the fact that by increasing the drive upon the wire at each shaving unit, it becomes practicable to use a relatively large number of shaving knives in each unit so that the number of units may be reduced. In this connection it will be noted that idler wheel 11 of the No. 1 shaving unit, which corresponds to the capstans of the other shaving units, is not power-driven in the present embodiment. The reason for this is that no additional friction drive is necessary because only a relatively small surface of wire is in actual shaving contact with the shaving knives in this first unit. In so far as the invention is concerned, however, the No. 1 shaving unit might be identical with the other shaving units. Furthermore, although four shaving units have been illustrated in the present embodiment, the precise number which will be required will depend somewhat upon the diameters and compositions of the wires which are to be fed into the plant and the size of the various tractor wheels.

An additional and important advantage resulting from the use of the power-driven capstans illustrated lies in the more accurate control that may be had over the wire resulting from the greater amount of driving power present in the plant. The provision of the relatively great frictional drive made possible by the capstans permits the wire to be driven at very slow speeds, allowing for close inspection of the operating conditions, and it also permits operation of the plant to be initiated under full load and to be maintained continuously at a relatively high speed without undue wear.

*Structure of the shaving units*

Figure 2 shows a perspective view of the tractor wheel, capstan and some of the associated parts of the No. 2 shaving unit. The wire W is indicated passing around wheel 20 and capstan 21. Wheel 20 is driven by means of an electric motor, not shown, and capstan 21 is driven by motor 27 through a reducing gear G. On the near side of the wheel, as viewed in Figure 2, part of a semicircular frame 102 appears. This frame is concentrically mounted with respect to wheel 20 and it includes an air duct 104 and an outer rim which provides a support for the shaving knives indicated generally by K. This frame is shown in greater detail in Figure 3, where inlets 105 to air duct 104 are shown. Figure 3 further shows the manner in which blades 110 of the shaving knives are mounted in brackets 112 upon studs 118 carried by frame 102.

Figure 2 illustrates metal filaments F being blown away from the knives by air ducts, in a manner to be described, and being led by means of supports, various of which are indicated by numeral 103, to a conveying means C comprising a pair of belts 101 which move in the directions indicated by the arrows to carry away the filaments. One conveyor is provided for each shaving unit and is so associated with the unit as to remove the filaments as cut by the unit in long, continuous strands. On the far side of wheel 20, as illustrated in Figure 2, an air funnel, or hood, H appears which exhausts air from the regions around the cutting knives so as to remove metal particles, dust, smoke, and the like and to aid with the air ducts in leading the individual filaments away from the wire being cut. The entrance to the hood is protected by a screen, as indicated.

Figure 3 sets forth the manner in which the brackets 112 are mounted on frame 102. Figure 5 sets forth an enlarged detail of this arrangement wherein the individual blades 110 are shown locked in brackets 112 by means of set screws 114. Brackets 112 are mounted on bracket bearings 116 which, in turn, are mounted upon studs 118 by a tapered bearing arrangement. Each bracket 116 carries a threaded arm 120 (see Figure 5) upon which is provided a yoke 122, adjustable through an adjustment nut 124. Yoke 122 serves to support a chain 125 (see also Figures 2 and 3) and by varying the amount of weight on chain 125 and by adjusting the lever provided by threaded arm 120 with adjustment nut 124 the force with which the cutting edge of the associated knife 110 engages the wire being shaved may be controlled. Between each of the knives an air duct 106 carrying a nozzle 107 is positioned to aid in removing the filaments as they are cut. This arrangement of air ducts and cutting knives does not form a part of the present invention but is described and claimed in the co-pending application of Crosby Field, filed herewith.

Figure 4 is an enlarged sectional view along the line 4—4 of Figure 2 and shows the manner in which the surface of wheel 20 is grooved, as at 111, to support the wire being shaved. These grooves are progressively shallower from left to right so as to maintain the adjacent cut surfaces of successive loops of the wire even with one another and thereby to compensate for the portions of wire removed as the wire progresses from one side of the wheel to the other.

Shaving unit speed control

Figure 6 is a perspective view of a portion of the No. 2 shaving unit, taken from the opposite side to that shown in Figure 2. Much of the actual shaving mechanism has been broken away in order to portray more clearly the control system therefor. Dancer roll 13 of the No. 1 shaving unit appears at the right-hand side of Figure 6 carried by an arm 15 which is keyed to a dancer roll shaft 150. The position of dancer roll 13 and, likewise, the position of dancer roll shaft 150, is determined by the length of the loop of wire passing around dancer roll 13.

Dancer roll shaft 150 is mounted in conventional bearings and carries on its end opposite to dancer roll arm 15 a double lever 152. Lever 152 is pinned to double links 154, which include adjustment screws 156, and each in turn is connected to one of the counterbalancing segment weights 158, 159, 160 and 161. These weights are keyed to a shaft 162 so that all segment weights thereupon move together. Shaft 162 is mounted in bearings in such manner that the number of segment weights thereupon may easily be changed. A clamp 164 secures the end of a sprocket chain 166 to segment weight 159 so that the chain passes under the segment weight in contact with its curved surface and around a sprocket 168 to a bar 170. By carrying sprocket chain 166 around the curved surface in this manner, the lever arm formed between the sprocket chain and shaft 162 remains constant in length regardless of the precise position of segment weight 159.

A pair of sprocket chains 172 and 173 are secured to the ends of bar 170 and are passed respectively around sprockets 174 and 175, carried by shaft 176, to support weights indicated at 177. The suspension of weights 177 is such that the number of weights may be adjusted. Shaft 176 is mounted in conventional bearings and its left-hand end, as viewed in Figure 6, carries a sprocket 178. An endless sprocket chain 180 passes about sprocket 178 and a sprocket 182 keyed on the control shaft of a rheostat 184. A rheostat arm 186 is also keyed to the control shaft of the rheostat and rotates with the movement of sprocket 182. If the speed of the wire through the No. 1 shaving unit is slightly less than its speed through the No. 2 shaving unit, dancer roll 13 and dancer roll arm 15 tend to move clockwise, as viewed in Figure 6, to maintain constant wire tension. Such movement swings double lever 152 clockwise and, in turn, through links 154, moves the segment weights in a counterclockwise direction and hence pulls upon sprocket chain 166. The pull upon chain 166 induces clockwise movement of shaft 176 and also clockwise movement of the control shaft of rheostat 184 by means of endless sprocket chain 180. Clockwise movement of the control shaft of rheostat 184 inserts additional resistance into the electrical circuit through the rheostat. This electrical circuit includes the field of a booster generator which supplies power to the motors for the tractor wheel and capstan of the No. 2 shaving unit. Increased resistance in rheostat 184, therefore, decreases the power supplied to the No. 2 shaving unit in a manner to be described in greater detail hereinafter. An increase in wire speed through the No. 1 shaving unit over wire speed through the No. 2 shaving unit causes the constant tension counterbalancing assembly to move dancer roll 13 counterclockwise as viewed in Figure 6. This counterclockwise movement is translated through the mechanism to decrease the resistance of rheostat 184 in the field circuit of the booster generator, and, therefore, to increase the power supplied to the motors of the tractor wheel and capstan of the No. 2 shaving unit.

Dancer roll 23 of the No. 2 shaving unit and dancer roll 33 of the No. 3 shaving unit are associated with mechanisms identical with that just described in connection with dancer roll 13 so that each dancer roll controls the speed of the next shaving unit of the series in response to the speed of the preceding shaving unit as determined by the loop of wire which passes around the dancer roll.

Dancer roll 43 of the No. 4 shaving unit operates through an electrical relay to control the power supplied to the wind-up drum in a manner to be described hereinafter. This electrical relay is used between the No. 4 shaving unit and the wind-up drum because at this point the wire has been shaved to a small fraction of its original cross-section and is relatively weak in tensional strength. The wire is shaved so thin by the last shaving unit that it is not strong enough to withstand the counterbalancing effects of weights sufficiently heavy to move the control shaft of a regulating rheostat and therefore, an electrical relay is inserted which is responsive to the position of the light counterweights of the No. 4 shaving unit to operate an electrical torque amplifier which supplies the necessary power to move the rheostats which control the driving force at the wind-up drum.

A manual control for positioning and locking dancer rolls 13, 23, and 33 is shown in Figure 6 in connection with dancer roll 13. A segment gear 188 is keyed to dancer roll shaft 150 intermediate dancer roll arm 15 and double lever 152. Sometimes it is desirable to relieve the tension in wire W, as for example, to make an adjustment to the wire or to repair a break. Upon such an occasion dancer roll shaft 150 may be rotated clockwise, as viewed in Figure 6, by means of segment gear 188 through a pinion 190 carried on a pinion shaft 192. A ratchet 194 is keyed to shaft 192 and may be rotated by a loosely mounted lever 196 which carries a pawl 197. Ratchet 194 may be locked in any position by means of a lever 198 which carries a stop 199.

Wind-up drum speed control

Referring to Figure 7, a portion of the control mechanism for controlling the power supplied to the wind-up drum in response to the position of the dancer roll of the No. 4 shaving unit is illustrated. Figure 8 represents a perspective view of another portion of this mechanism, taken from a slightly different angle. The two portions illustrated in Figures 7 and 8 work together as a single unit.

At the left-hand side of Figure 7, dancer roll 43, carried by dancer roll arm 45, is shown. Arm 45 is keyed to one end of a dancer roll shaft 200 mounted in roller bearings and having keyed to its opposite end an arm 202 for transferring motions through a link 204 to the segment weights 206, 207, and 208. The end of a sprocket chain 210 is secured to the underside of weight 207 and in contact with its curved under surface in a manner calculated to maintain a constant lever arm through weight 207 throughout the various positions taken by the segment weights. The segment weights are keyed to a roller bearing mounted shaft for swinging rotation after the fashion already described in connection with the segment weights shown in Figure 6.

Sprocket chain 210 is led around a sprocket guide 212 and upwardly to a bar 214 to which it is fastened. From bar 214 sprocket chains 216 and 217 pass upwardly over and around sprockets 220 and 221, respectively, carried by a shaft 222, and downwardly to a weight 224 suspended therefrom. Sprocket guide 212 and shaft 222 are carried in ball bearings.

The near end of shaft 222 carries a housing 226, shown in greater detail in Figures 9 and 10. A contact 225 is solidly mounted upon, but electrically insulated from, the end of shaft 222 within housing 226. Referring to Figure 9, a sprocket 230 is shown on shaft 222 and secured to housing 226. Sprocket 230 and housing 226 are freely rotatable upon shaft 222. Within housing 226 an insulating block 228 is shown which carries an insulating element 232, a contact segment 234, and a contact segment 235 (see Figure 10). Contact 225 turns with shaft 222 under the control of sprocket chains 216 and 217. Insulating element 232 and contact segments 234 and 235 turn with housing 226 and sprocket 230 in a manner to be described under the control of a sprocket chain 238 (see Figure 7).

Under ideal working conditions dancer roll 43 and dancer roll arm 45 are exactly counterbalanced by segment weights 206, 207, and 208, and the relatively small tension upon the thinly shaved wire passing around dancer roll 43 is exactly counterbalanced by the relatively light weight 224. With dancer roll 43 and dancer roll arm 45 in close balance with the segment weights, the tension upon the wire passing around dancer roll 43 at any time will depend upon the amount of the pull provided by weight 224. If the speed of the No. 4 shaving unit tends to increase over the speed at which wire is wound upon the wind-up drum, weight 224 maintains constant tension in the wire by lowering at a rate corresponding to the difference in speeds. In so lowering, shaft 222 is rotated in a clockwise direction, as viewed in Figure 7. Housing 226 and sprocket 230 remain stationary, however, whereupon contact 225 engages with contact segment 234, closing a circuit which applies more power to the wind-up drum in order to counteract the slight difference in speed and to return dancer roll 43 to its former, or neutral, position. Simultaneously, housing 226 and sprocket 230 are rotated clockwise to break the circuit which was closed by contact 225 and contact segment 234, in a manner now to be described.

Figure 8 shows in its upper left hand corner the other end of sprocket chain 238 from that illustrated and described in connection with Figure 7. Chain 238 passes around a sprocket 240 keyed to a countershaft 242 mounted in conventional bearings. Countershaft 242 is driven by a sprocket 256 through a sprocket chain 258 which passes downwardly about a driving sprocket, not shown, mounted upon a shaft 260. Shaft 260 is driven by an electric motor 262 through a speed reducing gear. When shaft 222 (see Figure 7) rotates in a clockwise direction to close the circuit between contact 225 and contact segment 234, electric motor 262 comes into operation to drive shaft 260 in a clockwise direction, as viewed in Figure 8. Clockwise movement of shaft 260 causes clockwise movement of shaft 242 and, through sprocket chain 238, clockwise movement of housing 226 (see Figure 7) until the circuit through contact 225 and contact segment 234 is broken.

Counterclockwise movement of shaft 222 makes a circuit through contact 225 and contact segment 235 to initiate operation of motor 262 in the opposite direction to rotate shaft 260 counterclockwise, as viewed in Figure 8. Counterclockwise movement of shaft 260 causes counterclockwise movement of counter-shaft 242 and hence of housing 226 until the circuit made by contact 225 and contact segment 235 is broken.

Figure 8 shows rheostats 248 and 254. When shaft 242 is rotated in a clockwise direction a sprocket 244 on shaft 242 causes clockwise movement of a sprocket 247 by means of a sprocket chain 246. Clockwise movement of sprocket 247 causes a reduction in the resistance provided by rheostat 248 in the armature circuit of the motor which drives the wind-up drum. Clockwise movement of shaft 242 also causes clockwise movement of a sprocket 250 on shaft 242 which, in turn, causes clockwise movement of a sprocket 253 by means of a sprocket chain 252. Clockwise movement of sprocket 253 causes a reduction of the resistance inserted by rheostat 254 in the field of a booster circuit which provides power to the armature of the motor which drives the wind-up drum.

Hence, clockwise rotation of shaft 242 provides a decrease in resistance in, and an increase in power supplied to, the armature circuit of the motor which drives the wind-up drum. With this arrangement, therefore, it is apparent that a slight increase in the speed of the wire which passes around dancer roll 43 causes a slight increase in the power applied to the wind-up drum. This slight increase in power tends to equalize the speed of the wire at the wind-up drum and to position the various counterbalancing means for optimum conditions.

Shaft 242 carries a cam 266, and below shaft 242 in position to be engaged by cam 266, under certain conditions, levers 268 and 270 are positioned. If shaft 242 rotates in a clockwise direction sufficiently far in response to sufficient changes in speed of the wire being shaved, cam 266 engages lever 268 to operate a mercury switch, which, through conventional relays not shown, stops motor 262. Likewise, counterclockwise movement of shaft 242 a sufficient distance in response to a sufficiently great change of speed causes cam 266 to come into engagement with lever 270 to operate a mercury switch which opens the contacts stopping motor 262.

Shaft 242 is provided with a manually adjustable friction brake 271 whereby a drag may be imposed against rotation of shaft 242 to eliminate hunting.

Toward the rear end of shaft 242, as viewed in Figure 8, a sprocket 272 is secured driving a sprocket chain 274. Chain 274 controls a rheostat in a circuit which positions a pointer on the main control board of the plant, which pointer shows the position at all times of dancer roll arm 45 so that an operator at the control board may determine by a glance at the pointer whether the dancer roll assembly for the No. 4 shaving unit is operating under the optimum conditions.

The electrical system

The wiring system of the plant is schematically represented in Figures 11a and 11b. Supply lines 300 and 301 for the fields of the various motors are indicated across the top of these figures. Supply lines 302 and 303 for the armature circuits of the various motors are indicated across the bottom of these figures.

Dynamic brake generators X, Y, and Z (see also Figure 1a) appear in the left-hand portion of Figure 11a. Current is supplied to the fields of these generators through individual lines including manual rheostats 316, as indicated. The armatures of these generators are connected to the contacts of double throw switches 318, each of which, as shown, is closed to direct a circuit through an adjustable resistance and a normally closed contactor in parallel with the resistance. This contactor opens automatically when the main line switch which supplies power to armature lines 302 and 303 for the driving motors of the plant is closed. The contactor is used to short-circuit the resistance when the main line switch is opened to bring the generator to an even stop. The control of generators X, Y, and Z is a part of the invention of Crosby Field and is disclosed and claimed in his copending application, filed herewith. Ordinarily one of the generators, or combinations of them, is driven by the movement of wire W with the armature circuit closed through the adjustable resistance rather than across leads to supply lines 302 and 303 so that the generator is run as a brake to create a tension on wire W. These generators can be run as motors in the reverse direction, however, to wind back slack as, for example, after the repair of a break in the wire. For a more detailed explanation of the feeding unit, reference should be had to said copending application of Crosby Field.

The field of motor 16, which motor drives wheel 10 of the No. 1 shaving unit, is connected into field supply lines 300 and 301 through a variable resistance 320. The armature of motor 16 is connected across armature supply lines 302 and 303 through an intermediate reversing switch 322. Switch 322 provides for running the motor in either direction so that the wheel driven thereby may more easily be threaded with wire or adjusted, or so that a break in the wire may be more easily repaired.

Current is supplied to lines 300 and 301 from a 240 volt D. C. source. Current is supplied to lines 302 and 303 by a variable voltage generator 306, indicated at the right in Figure 11b. Voltage from generator 306 is controlled through a field rheostat 308 which feeds from the 240 volt D. C. lines 300 and 301. Rheostat 308 is operated by a reversible electric motor driving a shaft indicated at 310. By means of an interlocking control mechanism, not shown, motor shaft 310 always positions rheostat 308 so that when generator 306 is first connected across supply lines 302 and 303 it supplies seven volts. Rheostat 308 is so controlled that the maximum output into lines 302 and 303 from generator 306 is 260 volts. The control board of the plant is provided with "raise" and "lower" buttons for controlling motor shaft 310, whereby, if it is desired to raise the voltage across lines 302—303, the "raise" button may be pushed down until motor shaft 310 positions rheostat 308 so that the output of generator 306 into lines 302—303 reaches the desired voltage. By pressing the "lower" button, motor shaft 310 increases the resistance through rheostat 308 until the "lower" button is released or until a minimum of seven volts is reached. A switch is indicated for opening the armature lines 302 and 303 under the control of a master relay 314. Relay 314 is interconnected with stop buttons throughout the plant and upon the control board so that the lines 302 and 303 may be instantly opened from any one of various convenient locations. Switch 312 can be closed only by a "start" button located on the control board. When switch 312 is opened, all the motors are brought to an even and immediate stop by virtue of the fact that their fields remain excited from the lines 300 and 301, whereby they have the effect of being converted into individual generators directing current through the armature lines and across the resistor 338. Resistor 338 is in series with a normally closed contactor, as illustrated. This contactor is held open as long as switch 312 is closed. An electrical and mechanical interlock, not shown, requires that this normally closed contactor be opened, and that the normally closed contactors which short circuit switches 318 of generators X, Y, and Z also be opened, before switch 312 can be closed. The pressing of the single "start" button first opens these contactors and then closes switch 312. By thus converting the various motors into generators operating across resistor 338, all of the motors, in effect, take on a dynamic braking action whenever armature line switch 312 is opened so that the entire plant is brought to an even stop. Every time switch 312 is opened, an interlocking mechanism returns rheostat 308 to the position which gives an output of seven volts from generator 306 into lines 302 and 303 and switch 312 cannot again be closed until rheostat 308 has been returned by motor shaft 310 to the seven volt position.

Motors 26 and 27, which drive the tractor wheel and capstan, respectively, of the No. 2 shaving unit are illustrated at the right-hand side of Figure 11a. Motors 36 and 37, which drive the tractor wheel and capstan, respectively, of the No. 3 shaving unit and motors 46 and 47, which drive the tractor wheel and capstan, respectively, of the No. 4 shaving unit, are indicated in the left-hand portion of Figure 11b. The details of the circuits for these latter four motors will not be described because they correspond to those of the control system of motors 26 and 27. Corresponding parts in the No. 3 shaving unit control have been given the same reference characters as those parts in the No. 2 shaving unit except for the addition of an *a*. Similarly, corresponding parts of the No. 4 shaving unit are indicated by identical reference numerals with the addition of a *b*.

Referring to motors 26 and 27, the fields are shown connected in parallel with one another across lines 300 and 301. A variable resistance 324 is indicated in series with the field of motor 27. The armatures of motors 26 and 27 likewise are in parallel with one another and are provided for connection into supply lines 302 and 303 through the armature of a booster generator 325 by means of a reversing switch 326. The field of booster generator 325 is connected through rheostat 184 to lines 300b and 301b. Normally open contactors 304 and 305 automatically are closed to complete the circuit between lines 300 and 300b, and lines 301 and 301b, when switch 312 is closed. An electrical interlock with switch 312 assures that contactors 304 and 305 shall open whenever switch 312 opens. Rheostat 184, previously described in connection with Figure 6, is in series with the field of booster generator 325. Rheostat 184 is controlled, as previously described, through the sprocket indicated at 178.

Motor 56 for the wind-up drum is shown in Figure 11b. Its field is connected across lines 300 and 301 and the current supplied thereto is subject to adjustment through a variable resistance 332. The armature of motor 56 is provided for being connected into supply lines 302 and 303 through the leads 334 and 335 of a reversing switch 337. The armature of a booster generator 325c is connected in series with lead 334 with its output under the control of rheostat 254 (see also Figure 8) as effected through the sprocket indicated at 250. The current flowing through the armature of motor 56 is also under the control of rheostat 248 (see also Figure 8) in response to the position of the sprocket indicated at 244.

In the armature circuit of each of the motors, a load responsive relay L is indicated for opening switch 312 upon an overload therethrough. Each of the armature circuits for the motors X, Y, Z and 56 also includes a no-load responsive relay N which opens switch 312 upon a break anywhere in the wire being shaved, since such break would cause a loss of load either at the feeding unit or at the winding unit.

The speed at which the No. 1 shaving unit is to be operated is adjusted through rheostat 320 and motor 16 of the No. 1 shaving unit may, therefore, be called the "lead" motor. The speeds at which the other motors will be operated are automatically governed by means of the booster generators responding to the wire speed as indicated by the dancer rolls, in the manner described. In the embodiment illustrated the booster generators have a maximum output of about thirty volts. The relative relationships between tractor wheel motor and capstan motor in the Nos. 2, 3 and 4 shaving units may be adjusted through variable resistances 324, 324a, and 324b.

The invention has been illustrated and described in the form which it takes in one plant now in operation. The embodiment illustrated and described, as pointed out above, has made the production of metal wool practical in a more compact plant than any known in the prior art, requiring fewer operators and capable of being run with a higher yield and under better control.

As many embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In apparatus of the class described wherein metal wool is shaved from wire, the combination with a wire feeding means of: a first shaving unit comprising a motor-driven tractor wheel and a dancer roll the position of which is responsive to wire speed; second, third and fourth shaving units each comprising a motor-driven tractor wheel, a motor-driven capstan and a dancer roll the position of which is responsive to wire speed; a wind-up unit comprising a motor driven wind-up drum; means for controlling the speed at which the first shaving unit operates; means responsive to the position of the first dancer roll for controlling the speed at which the second shaving unit is operated; means responsive to the position of the second dancer roll for controlling the speed at which the third shaving unit is operated; means responsive to the position of the third dancer roll for controlling the speed at which the fourth shaving unit is operated; and means responsive to the position of the fourth dancer roll for controlling the speed at which the wind-up drum is operated.

2. Apparatus as set forth in claim 1 further characterized by the fact that one of the speed-controlling means comprises an electrical relay, a motor and a rheostat; said relay including contact means, one of which is moved by movement of an associated dancer roll to complete a circuit through said motor; said motor being arranged to vary the effect of said rheostat, and said rheostat being arranged in series with the power supply to the motor-drive of the following unit.

3. In a plant for producing metal wool from a wire including a power driven tractor wheel of a width to receive a plurality of wire loops side by side and around which the wire may be passed, and a plurality of knives positioned adjacent the periphery of the tractor wheel and adapted to shave wool-like metal filaments from the wires of the loops as the tractor wheel rotates to drive the wire past the knives, the combination with said tractor wheel of a friction booster; said friction booster including: a capstan of approximately the same width as the tractor wheel and about which each loop of wire passing about the tractor wheel may also be passed, power supply means for driving said capstan, and means for controlling said power supply means; whereby tension in the flights of a wire loop passing about both the tractor wheel and said capstan may be raised or lowered by raising or lowering the power supplied to said capstan.

4. In a plant for producing metal wool from a wire including a power driven tractor wheel of a width to receive a plurality of wire loops side by side and around which the wire may be passed, and a plurality of knives positioned adjacent the periphery of the tractor wheel and adapted to shave wool-like metal filaments from the wires of the loops as the tractor wheel rotates to drive the wire past the knives, the combination with said tractor wheel of a friction booster; said friction booster including: a capstan of approximately the same width as the tractor wheel and about which each loop of wire passing about the tractor wheel may also be passed, an electric motor for driving said capstan, and a variable resistance for controlling current supplied to said electric motor; whereby the driving power of said motor may be regulated independently of the power supplied to the tractor wheel.

5. In a plant for shaving metal wool from wire, the combination including a tractor wheel and a capstan of approximately the same width and adapted to receive a common loop of wire, an electric motor arranged to drive the tractor wheel, an electric motor arranged to drive the capstan, means for supplying and controlling electric power to said tractor wheel and capstan motors, and means for adjusting the supply of power to said capstan motor with respect to the supply of power to said tractor wheel motor, whereby the power supplied to the capstan motor may be modulated with respect to the power supplied to the tractor wheel motor thereby to raise or lower the pull of the capstan upon the wire.

6. Apparatus as set forth in claim 1 further characterized by the fact that one of the speed controlling means comprises a multi-position electric relay, a reversible motor operated by said relay, and a rheostat operated by said reversible motor; said rheostat being arranged in series with the power supply to the motor-drive of the following unit; and said relay including floating contact means, and a pair of segment contact means normally disposed one on each side of said floating contact means and spaced therefrom for completing operating circuits through said motor, one of said contact means being responsive to movements of an associated dancer roll to bring portions of said contact means together to close a circuit through said motor and institute a regulating action through said rheostat, and the other of said contact means being responsive to operating movements of said motor to open said motor circuit when a predetermined rheostat regulation has been accomplished.

CROSBY FIELD.
GERALD C. TOOLE.